(12) United States Patent
Miyata

(10) Patent No.: US 8,379,241 B2
(45) Date of Patent: Feb. 19, 2013

(54) PRINTING SYSTEM, AND INFORMATION PROCESSING DEVICE AND COMPUTER READABLE MEDIUM THEREFOR FOR CONTROLLING THE NUMBER OF PAGES TO BE PRINTED

(75) Inventor: Yuji Miyata, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 470 days.

(21) Appl. No.: 12/695,470

(22) Filed: Jan. 28, 2010

(65) Prior Publication Data

US 2010/0195134 A1    Aug. 5, 2010

(30) Foreign Application Priority Data

Jan. 30, 2009 (JP) ................. 2009-019836

(51) Int. Cl.
*G06F 15/00* (2006.01)
*G06F 3/12* (2006.01)
*G06K 1/00* (2006.01)

(52) U.S. Cl. ..................... 358/1.14; 358/1.15

(58) Field of Classification Search ........... None
See application file for complete search history.

(56) References Cited

U.S. PATENT DOCUMENTS 7,124,094 B1 * 10/2006 Kobayashi et al. ............. 705/64
7,525,682 B2    4/2009 Mori et al.
2002/0131086 A1    9/2002 Mori et al.
2005/0062999 A1    3/2005 Fujinaga
2012/0070251 A1 *  3/2012 Nishikawa et al. ............. 412/13

FOREIGN PATENT DOCUMENTS

| JP | 2000-263904 |   | 9/2000 |
| JP | 2002-333971 | A | 11/2002 |
| JP | 2002-361985 | A | 12/2002 |
| JP | 2004-098505 | A | 4/2004 |
| JP | 2004-152139 |   | 5/2004 |
| JP | 2005-096242 | A | 4/2005 |

OTHER PUBLICATIONS

Notification of Reasons of Rejection mailed Nov. 30, 2010 in corresponding Japanese Patent Application No. 2009-019836, together with English language translation.

* cited by examiner

*Primary Examiner* — Douglas Tran
(74) *Attorney, Agent, or Firm* — Scully, Scott, Murphy & Presser, PC

(57) ABSTRACT

A printing system includes an image forming device and an information processing device configured to transmit print data containing a plurality of pages of images to the image forming device and control the image forming device to print the images on sheets based on the print data. The information processing device includes a first transmitter configured to sequentially transmit, to the image forming device, print data of each of a main page and one or more ancillary pages to be printed in connection with the main page, and a second transmitter configured to transmit, to the image forming device, booking information regarding a number of the ancillary pages in association with transmission of the print data of the main page.

18 Claims, 11 Drawing Sheets

BOOKING INFORMATION IN POSTER PRINTING

| BOOKING ID | NUMBER OF BOOKING PAGES |
|---|---|
| UserA20081215175620 | 3 |

FIG.14A

BOOKING INFORMATION IN AUTOMATIC DOUBLE-SIDE PRINTING

| BOOKING ID | NUMBER OF BOOKING PAGES |
|---|---|
| UserA20081215175621 | 1 |

FIG.14B

BOOKING INFORMATION IN MANUAL DOUBLE-SIDE PRINTING

| BOOKING ID | NUMBER OF BOOKING PAGES |
|---|---|
| UserA20081215175622 | 1 |
| UserA20081215175623 | 1 |

FIG.14C

PRINTING SYSTEM, AND INFORMATION PROCESSING DEVICE AND COMPUTER READABLE MEDIUM THEREFOR FOR CONTROLLING THE NUMBER OF PAGES TO BE PRINTED

CROSS-REFERENCE TO RELATED APPLICATION

This application claims priority under 35 U.S.C. §119 from Japanese Patent Application No. 2009-019836 filed on Jan. 30, 2009. The entire subject matter of the application is incorporated herein by reference.

BACKGROUND

1. Technical Field

The following description relates to one or more techniques for print booking in a printing system that has a function to print a set of a main page and one or more ancillary pages to be printed in connection with the main page.

2. Related Art

So far, a number-of-printed-pages management system has been known, which is utilized by an image forming device, such as a printer and a multi-function peripheral (MFP), mainly installed in an office. The number-of-printed-pages management system is adapted to restrict the number of pages that each person or each department is permitted to print during a predetermined period of time. For example, the following explanation will be provided under an assumption that a user A is permitted to print up to 100 pages in one month. Under such an assumption, when a cumulative number of pages printed by the user A during one month reaches 100, even though the user A transmits further print data to an image forming device during the same period, the image forming device is not allowed to perform any printing operation for the user A. Thus, it is possible to manage printing costs by restricting the number of pages printable by each person or each department using the number-of-printed-pages management system.

SUMMARY

However, the aforementioned management system may cause a problem that when a request to print a document of a predetermined number of pages at a time is issued in a situation where a remaining number of printable pages is less than the predetermined number, a user (the requestor of the request) cannot have the complete document. The above problem is more likely to be caused, rather than a regular printing method, especially in a special printing method to print a set of a main page and one or more ancillary pages to be printed in connection with the main page (e.g., poster printing to print a plurality of pages into which a single page of image is divided, and double-side printing to print successive pages on both sides of each sheet).

For example, in the poster printing, when the cumulative number of printed pages reaches a maximum number of printable pages before all of divisional pages are completely printed, and the printing is terminated halfway, it is impossible to resume the printing from a first one of unprinted pages. Therefore, the printing has to be reattempted from the beginning with another image forming device. At this time, it is unfortunate that already-printed sheets are useless. Further, in the double-side printing, when the cumulative number of printed pages reaches the maximum number of printable pages before a second side (the backside of a first side) of a sheet is completely printed after the first side of the sheet is completely printed, and the double-side printing is terminated halfway, only the second side has to be reprinted. At this time, a user effort is needed to reset the sheet. Further, in the case of manual double-side printing where sheets have to be manually reversed, the second sides of the sheets are printed after the first sides of the sheets are completely printed. Hence, when the cumulative number of printed pages reaches the maximum number of printable pages in the middle of the printing, the user is required to reattempt the printing from the beginning, or reset sheets which are not completely printed and perform printing of unprinted pages while identifying pages to be printed on a page-by-page basis. It results in a lot of useless printed sheets or a serious burden placed on the user.

In order to avoid the above undesired situation, a system has been proposed which has a function to perform printing of pages to be printed, only when determining that it is possible to print all of the pages, in comparison, made prior to execution of the printing, between the number of the pages to be printed and a remaining number of printable pages.

In this respect, however, the above function can be attained under the following restriction. When an information processing device, which outputs print data, uses an operating system (OS) such as Windows (trademark registered), it is impossible for the image forming device to grasp the total number of pages to be printed as long as the information processing device does not completely output all pages of print data, owing to specifications of the OS. Therefore, the above system has a problem that it takes an extra period of time until the printing is completed, because it is determined whether all of the pages to be printed are printable, after the print data of all pages is completely output, and then the printing is begun.

Aspects of the present invention are advantageous to provide one or more improved techniques that make it possible to, when the number of printable pages is restricted up to a maximum number, efficiently avoid incompletely printed document.

According to aspects of the present invention, a printing system is provided which includes an image forming device, and an information processing device configured to transmit print data containing a plurality of pages of images to the image forming device and control the image forming device to print the images on sheets based on the print data. The information processing device includes a first transmitter configured to sequentially transmit, to the image forming device, print data of each of a main page and one or more ancillary pages to be printed in connection with the main page, and a second transmitter configured to transmit, to the image forming device, booking information regarding a number of the ancillary pages in association with transmission of the print data of the main page. The image forming device includes a receiver configured to receive data from the information processing device, a storage unit configured to store a remaining number of pages printable by the image forming device, a determining unit configured to, when the receiver receives the booking information along with the print data of the main page from the information processing device, determine whether a number of the main page and the ancillary pages that is determined based on the received booking information is equal to or less than the remaining number of printable pages stored on the storage unit, a registering unit configured to, when the determining unit determines that the number of the main page and the ancillary pages is equal to or less than the remaining number of printable pages, register a booking for printing of the main page and the ancillary pages, and a printing unit configured to print the main page and the ancillary pages based on the booking registered by the registering unit.

According to aspects of the present invention, further provided is an information processing device configured to transmit print data containing a plurality of pages of images to an image forming device and control the image forming device to print the images on sheets based on the print data. The information processing device includes a first transmitter configured to sequentially transmit, to the image forming device, print data of each of a main page and one or more ancillary pages to be printed in connection with the main page, and a second transmitter configured to transmit, to the image forming device, booking information regarding a number of the ancillary pages in association with transmission of the print data of the main page.

According to aspects of the present invention, further provided is a computer readable medium having computer readable instructions stored thereon. When executed by a computer configured to transmit print data containing a plurality of pages of images to an image forming device and control the image forming device to print the images on sheets based on the print data, the instructions cause the computer to perform a first transmitting step of sequentially transmitting, to the image forming device, print data of each of a main page and one or more ancillary pages to be printed in connection with the main page, and a second transmitting step of transmitting, to the image forming device, booking information regarding a number of the ancillary pages in association with transmission of the print data of the main page.

BRIEF DESCRIPTION OF THE ACCOMPANYING DRAWINGS

FIG. 1 is a block diagram schematically showing an overall configuration of a printing system in an embodiment according to one or more aspects of the present invention.

FIG. 2 schematically exemplifies a graphical user interface (GUI) to allow a user to select a printing method in the embodiment according to one or more aspects of the present invention.

Figure 6:
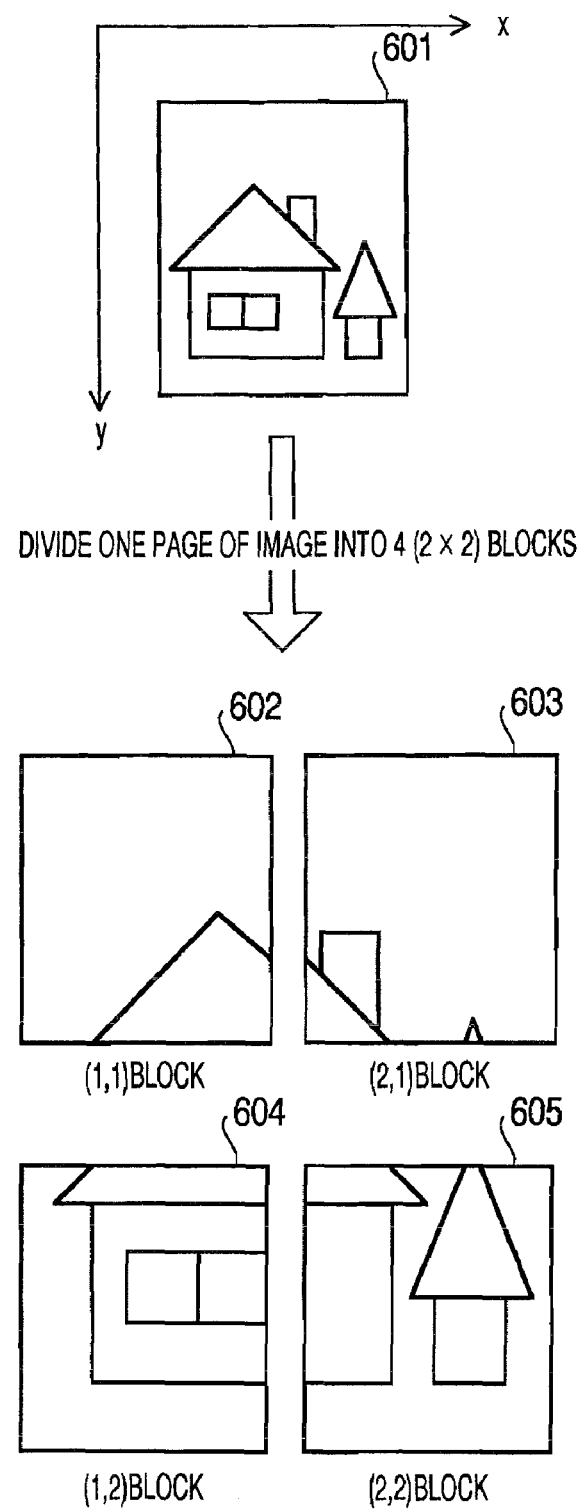

FIG. 6 schematically shows a specific example of a poster printing in the embodiment according to one or more aspects of the present invention.

Figure 7:
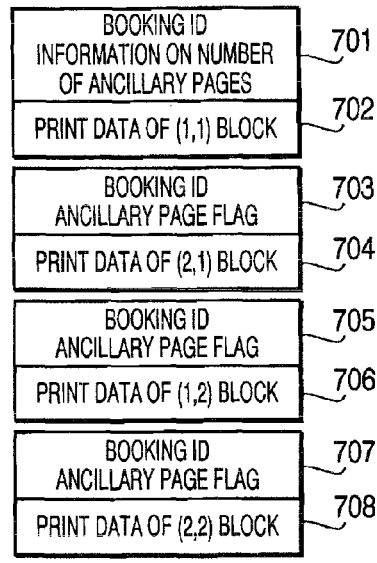

FIG. 7 exemplifies a list of all pieces of print data transmitted by a PC to a printer in the poster printing process in the embodiment according to one or more aspects of the present invention.

Figure 8:
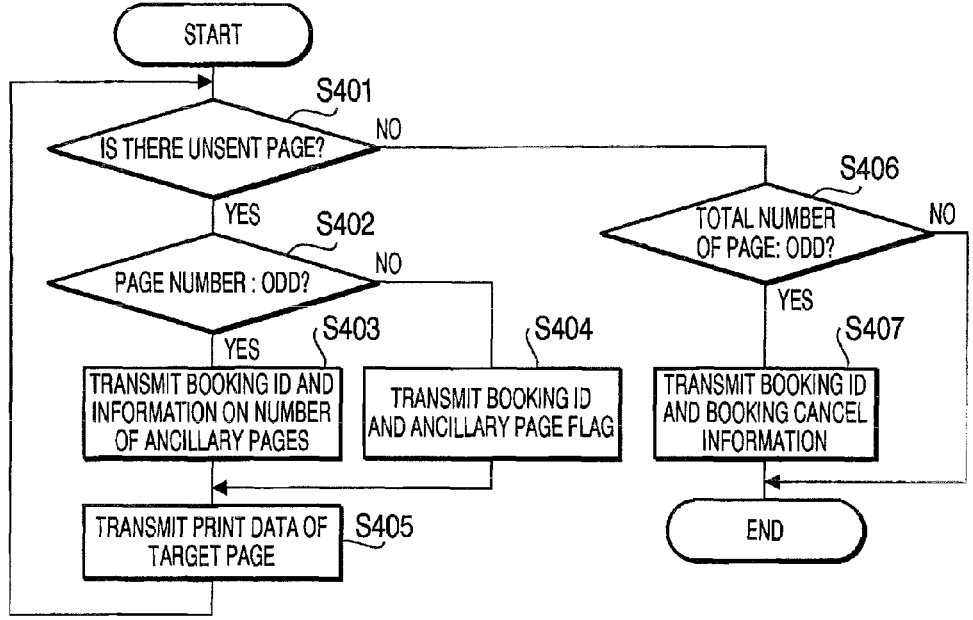

FIG. 8 is a flowchart showing a procedure of an automatic double-side printing process in the embodiment according to one or more aspects of the present invention.

Figure 9:
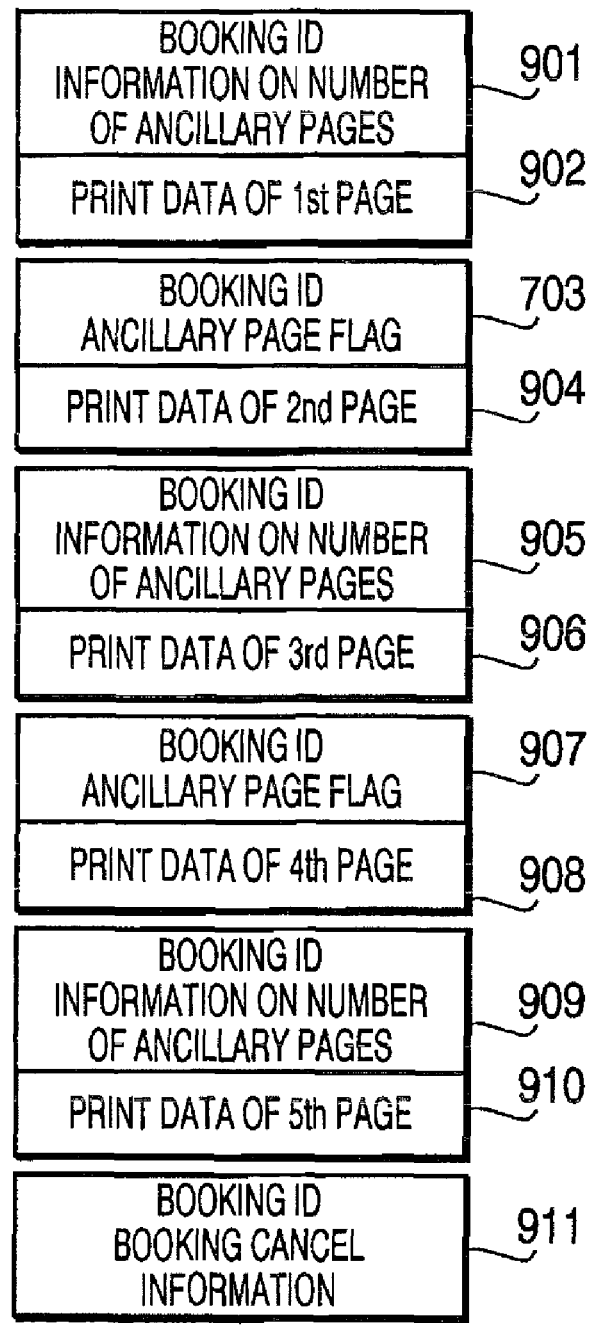

FIG. 9 exemplifies a list of all pieces of print data transmitted by the PC to the printer in the automatic double-side printing process in the embodiment according to one or more aspects of the present invention.

Figure 10:
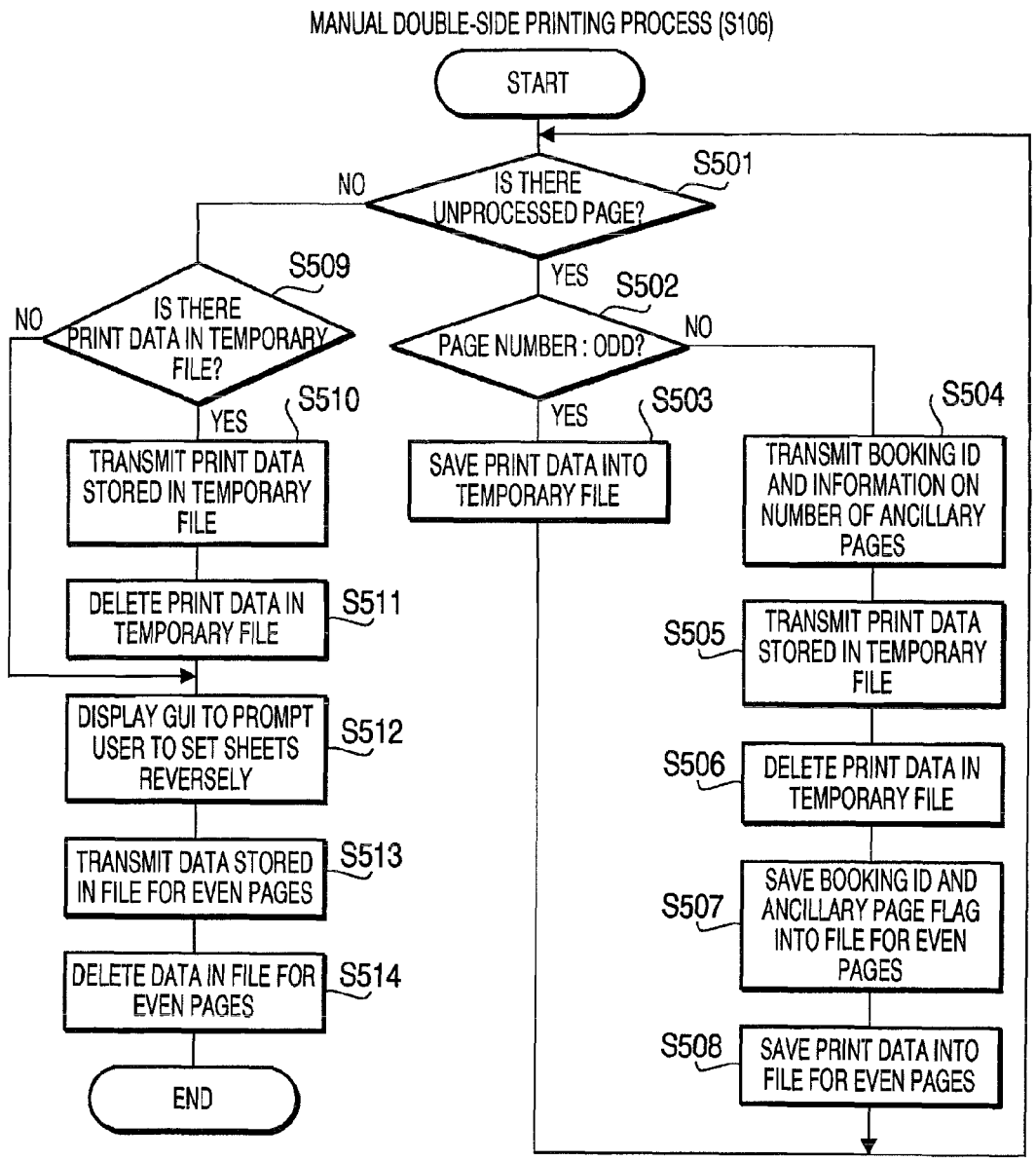

FIG. 10 is a flowchart showing a procedure of a manual double-side printing process in the embodiment according to one or more aspects of the present invention.

Figure 11:
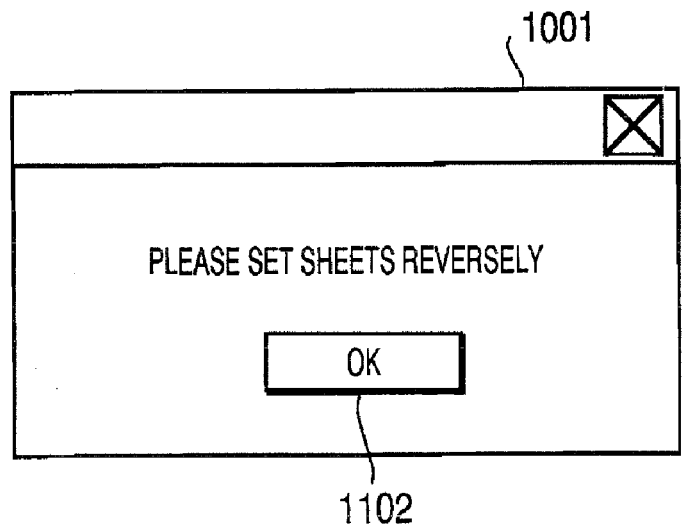

FIG. 11 schematically exemplifies a GUI to prompt a user to reverse sheets in the manual double-side printing process in the embodiment according to one or more aspects of the present invention.

Figure 12:
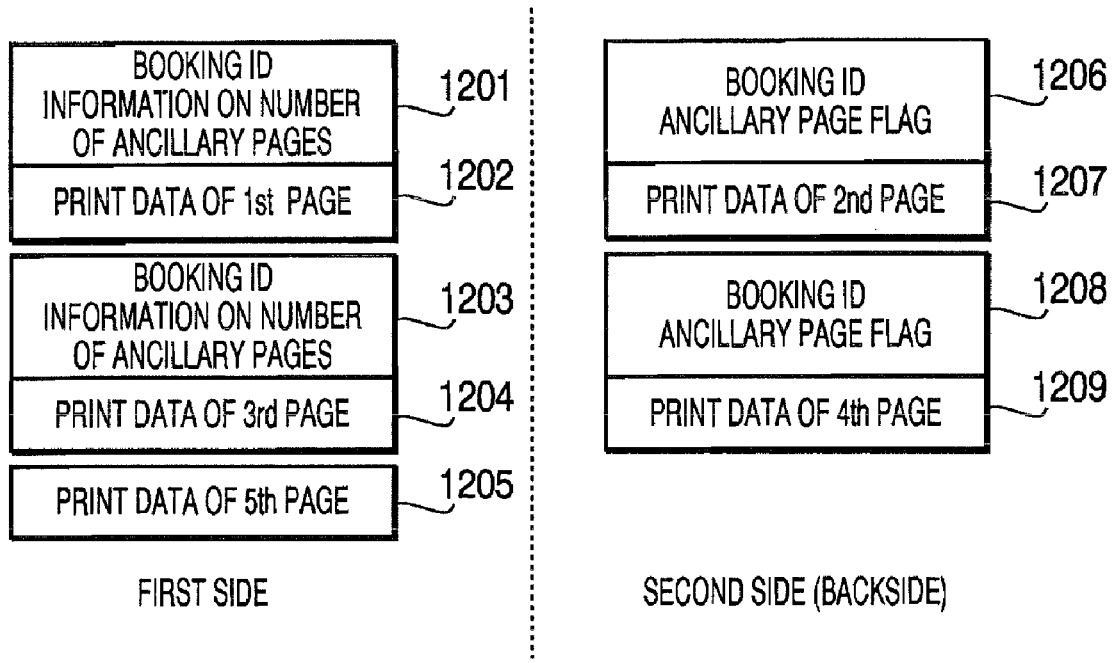

FIG. 12 exemplifies a list of all pieces of print data transmitted by the PC to the printer in the manual double-side printing process in the embodiment according to one or more aspects of the present invention.

Figure 13:
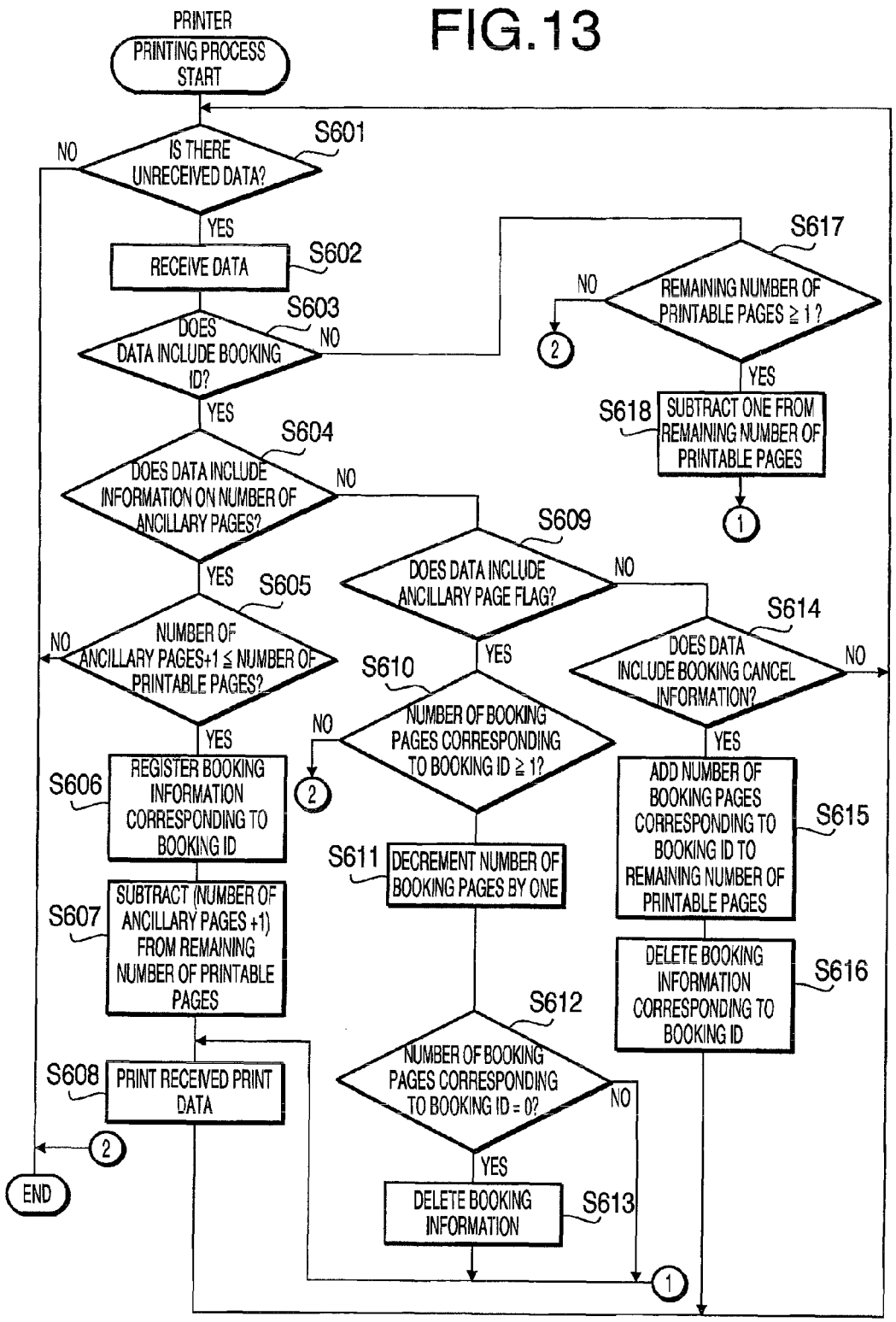

FIG. 13 is a flowchart showing a procedure of a printing process to be executed by the printer in the embodiment according to one or more aspects of the present invention.

FIG. 14A schematically exemplifies booking information in the poster printing in the embodiment according to one or more aspects of the present invention.

FIG. 14B schematically exemplifies booking information in an automatic double-side printing in the embodiment according to one or more aspects of the present invention.

FIG. 14C schematically exemplifies booking information in a manual double-side printing in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompany drawings.

[Configuration of Printing System]

A printing system of an embodiment is provided with a personal computer (PC) 1 and a printer 100 connected with the PC 1.

The PC 1 has the same configuration as a known computer device, and includes a CPU 10, a ROM 12, a RAM 14, a hard disk drive (HDD) 16, a display unit 18, an operation unit 20, and a communication interface (I/F) 22.

The CPU 10 is a processor configured to perform various arithmetical operations in accordance with programs and data stored on the ROM 12. In the embodiment, according to a printer driver installed in the PC 1, the CPU 10 performs a below-mentioned print control process to transmit print data to the printer 100. The ROM 12 is a storage device configured to hold information stored thereon even after the PC 1 is powered off and to store read-only data and programs such as an IPL and a BIOS.

The RAM 14 is a storage device utilized as a main memory directly accessed by the CPU 10. The RAM 14 is configured to load from the ROM 12 or the HDD 16 various programs to be executed by the CPU 10 and to store results of the various arithmetical operations by the CPU 10 and various kinds of data. When performing arithmetical operations related to the aforementioned print control, the CPU 10 loads programs for executing the arithmetical operations form the HDD 16 into the RAM 14. Then, the CPU 10 executes the operations in accordance with the programs stored on the RAM 14.

Figure 1:
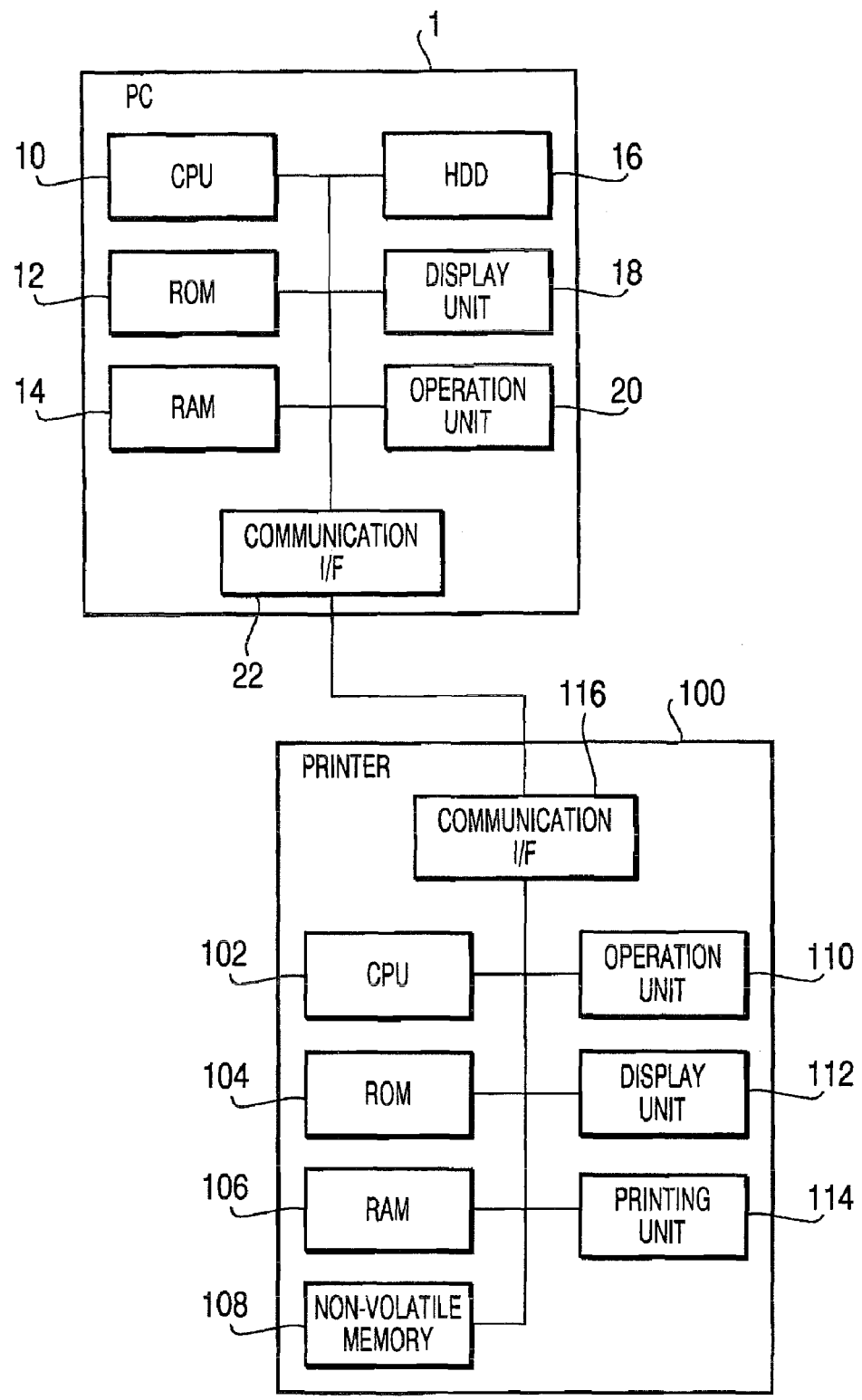

The HDD 16 is a subsidiary storage device for storing the OS, application programs, and various data files. The display unit 18 is configured with a liquid crystal display (LCD) device to display various kinds of information. The operation unit 20 is provided with a pointing device such as a mouse and a keyboard and configured to issue to the CPU 10 a command in response to user's input operation therethrough. The communication I/F 22 is a hardware interface for connecting the PC 1 with peripheral devices such as a printing device or a network. It is noted that FIG. 1 shows a state where the PC 1 is connected, communicably via the communication I/F 22, with the printer 100.

The printer 100 is a printing device configured to print an image on a sheet. The printer 100 includes a CPU 102, a ROM 104, a RAM 106, a non-volatile memory 108, an operation unit 110, a display unit 112, a printing unit 114, and a communication interface (I/F) 116.

The CPU 102 is a processor configured to perform various arithmetical operations in accordance with programs and data stored on the ROM 104. The CPU 102 executes arithmetical operations related to the aforementioned image printing. The ROM 104 is a storage device configured to hold information stored thereon even after the printer 100 is powered off. The ROM 104 stores programs for controlling the printer 100 and read-only data that is not normally updated.

The RAM 106 is a storage device utilized as a main memory directly accessed by the CPU 102. The RAM 106 is configured to load from the ROM 104 the various programs to be executed by the CPU 102 and to store results of the various arithmetical operations by the CPU 102 and various kinds of data. When performing arithmetical operations related to the aforementioned image printing, the CPU 102 loads programs for executing the arithmetical operations from the ROM 104 into the RAM 106. Then, the CPU 102 executes the arithmetical operations in accordance with the programs stored on the RAM 106.

The non-volatile memory 108 includes a rewritable semiconductor memory (e.g., a flash memory) configured to store various kinds of information and save the information stored thereon even after an electrical power supply thereto is blocked. The operation unit 110 is provided with a key switch group such as a numeric keypad, character keys, and function keys, and configured to issue to the CPU 102 a command in response to a user's input operation therethrough. The display unit 112 is an output device provided with an LCD device and configured to display various kinds of information such as an operational status of the printer 100 and operating guidance.

The printing unit 22 is configured to print an image on a sheet in an inkjet printing method or a laser printing method, based on control by the CPU 102. The communication I/F 116 is an hardware interface, such as a serial bus (e.g., a Universal Serial Bus (USB) and a network adaptor), for connecting the printer 100 with other information processing devices.

[General Overview of Functions of Printing System]

In the aforementioned printing system, the printer 100 includes a number-of-printed-pages management system to restrict the number of pages printable by each person or each department during a predetermined period of time. For the management system, a remaining number of printable sheets during the period is stored on the non-volatile memory 108 for each predetermined management unit such as a person and a department. In the management system, an upper limit of the number of printable pages is set for a user. When the number of pages printed by the user during the period reaches the upper limit, namely, when the remaining number of printable pages comes to zero, even though the user transmits print data from the PC 1 to the printer 100 during the period, the printer 100 does not perform a printing operation based on the print data.

It is noted that the number of printed pages represents a number to be incremented by one each time a printing operation is performed on a sheet side, regardless of the number of printed sheets. Specifically, when both sides of a sheet are printed, the number of printed pages is two. Furthermore, when a document to be printed that contains a sheet of image is divided into a plurality of pages (blocks) and the blocks are printed on respective different sheet sides, the number of printed pages is counted on a block-by-block basis (i.e., by one page for one block).

Further, the PC 1 is configured to allow the user to select a method for printing a document from among regular printing, automatic double-side printing, manual double-side printing, and poster printing, and to transmit to the printer 100 print data of each page of the document in a format corresponding to the selected printing method.

The regular printing is a printing method to sequentially print each page of image contained in the document to be printed, on a single side of a sheet. The automatic double-side printing is one of special printing methods adapted such that when printing a plurality of successive pages contained in the document to be printed, the printer 100 performs printing while automatically reversing each sheet, and print images alternately on a first side and a second side (back side) of the sheet. The manual double-side printing is one of special printing methods for, at the time to print a plurality of successive pages contained in the document to be printed, continuously printing only odd pages (or even pages) on first sides of sheets, then setting the sheets with the first pages printed in a manner reversed manually by the user, and continuously printing the remaining even pages (or odd pages) on the second sides of the sheets. The poster printing is one of special printing methods for printing out a large-sized image by dividing each page of image contained in the document to be printed into a plurality of blocks and printing the blocks on respective different sheets.

It is noted that the selection of the printing method is made by the user through a graphical user interface (GUI) that the CPU 10 of the PC 1 displays on the display unit 18.

Figure 2:
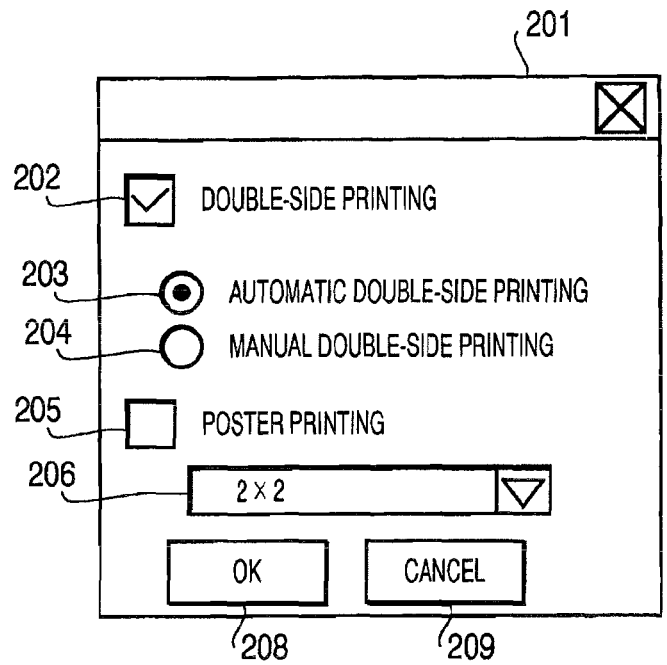

As illustrated in FIG. 2, a GUI 201 for selecting the printing method includes check boxes 202 and 205 for specifying a special printing method such as the double-side printing and the poster printing. By checking the check box 202 or 205 (i.e., placing a "✓" mark in a square of the check box 202 or 205) with the pointing device, a printing method corresponding to the option selected on the GUI 201 is applied. When any of the check boxes 202 and 205 is not checked, the regular printing is applied.

The GUI 201 further includes, beneath the check box 202 for the double-side printing, radio buttons 203 and 204 for making a choice between the automatic double-side printing and the manual double-side printing. In the case where the check box 202 for the double-side printing is checked, it is possible to select one of the automatic double-side printing and the manual double-side printing by checking one of the radio buttons 203 and 204 (i.e., placing a "●" mark in one of the radio buttons 203 and 204) with the pointing device.

The GUI 201 further includes, beneath the check box 205 for the poster printing, a pull-down menu 206 for specifying the number of divisional blocks into which a page of image is divided. In the case where the check box 205 for the poster printing is checked, it is possible to specify the number of divisional blocks for the poster printing by clicking a desired number of divisional blocks selectively from the pull-down menu 206 with the pointing device. In the pull-down menu 206, the number of divisional blocks into which a page of image is divided in the poster printing is expressed with "the number of divisional blocks in the horizontal direction x the number of divisional blocks in the vertical direction." For example, an expression "2×2" for the number of divisional blocks represents four divisional blocks in total with two even divisional blocks in the horizontal direction and two even divisional blocks in the vertical direction.

By clicking an "OK" button 208 with the pointing device after selecting the printing method on the GUI 201, the selected printing method is applied to an actually performed printing operation. Meanwhile, by clicking a "Cancel" button 209, the printing method selected on the GUI 201 is nullified and a previous setting is maintained.

[Print Control Process by PC]

Figure 3:
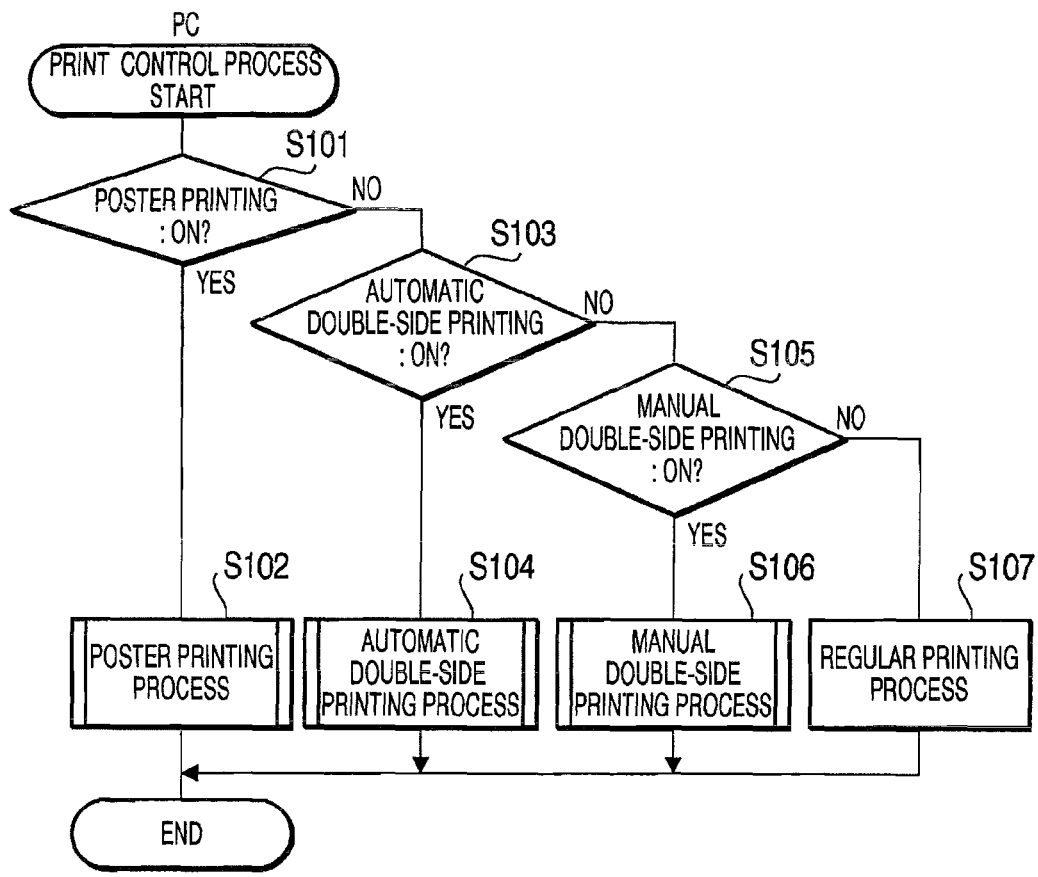
FIG. 3 is a flowchart showing a procedure of a print control process in the embodiment according to one or more aspects of the present invention.

A procedure of a print control process to be executed by the PC 1 will be set forth with reference to FIG. 3. The print control process is adapted to be performed in response to a request for printing of a document being issued to the PC 1.

Initially, the CPU 10 of the PC 1 determines, based on the printing method specified on the GUI 201 (see FIG. 2), whether the poster printing is set on (active) (S101). When the poster printing is set on (S101: Yes), the CPU 10 performs a poster printing process to transmit print data on which each page of image is divided into a plurality of blocks (S102). After transmission of the print data in S102, the CPU 10 terminates the print control process. The poster printing process will be described in detail later.

Meanwhile, when determining in S101 that the poster printing is set off (S101: No), the CPU 10 determines whether the automatic double-side printing is set on (S103). When determining that the automatic double-side printing is set on (S103: Yes), the CPU 10 performs an automatic double-side printing process in which the printer 100 automatically reverse sheets and print an image on each of both sides of each sheet (S104). After transmission of print data in S104, the CPU 10 terminates the print control process. The automatic double-side printing process will be described in detail later.

Meanwhile, when determining that the automatic double-side printing is set off (S103: No), the CPU 10 determines whether the manual double-side printing is set on (S105). When determined that the manual double-side printing is set on (S105: Yes), the CPU 10 performs a manual double-side printing process in which the user manually reverses sheets and the printer 100 prints an image on each of both sides of each sheet (S106). After transmission of print data in S106, the CPU 10 terminates the print control process. The manual double-side printing process will be described in detail later.

Meanwhile, when determining that the manual double-side printing is set off (S105: No), the CPU 10 performs a regular printing process to sequentially print a page of image on a single side of a sheet (S107). After transmission of print data in S107, the CPU 10 terminates the print control process. Since a procedure of the regular printing process has been known, a detailed explanation about it will be omitted in the embodiment.

[Poster Printing Process by PC]

Subsequently, the poster printing process executed in S102 of the aforementioned print control process (see FIG. 3) will be described in detail with reference to flowcharts in FIGS. 4 and 5 and illustrations in FIGS. 6 and 7.

Figure 4:
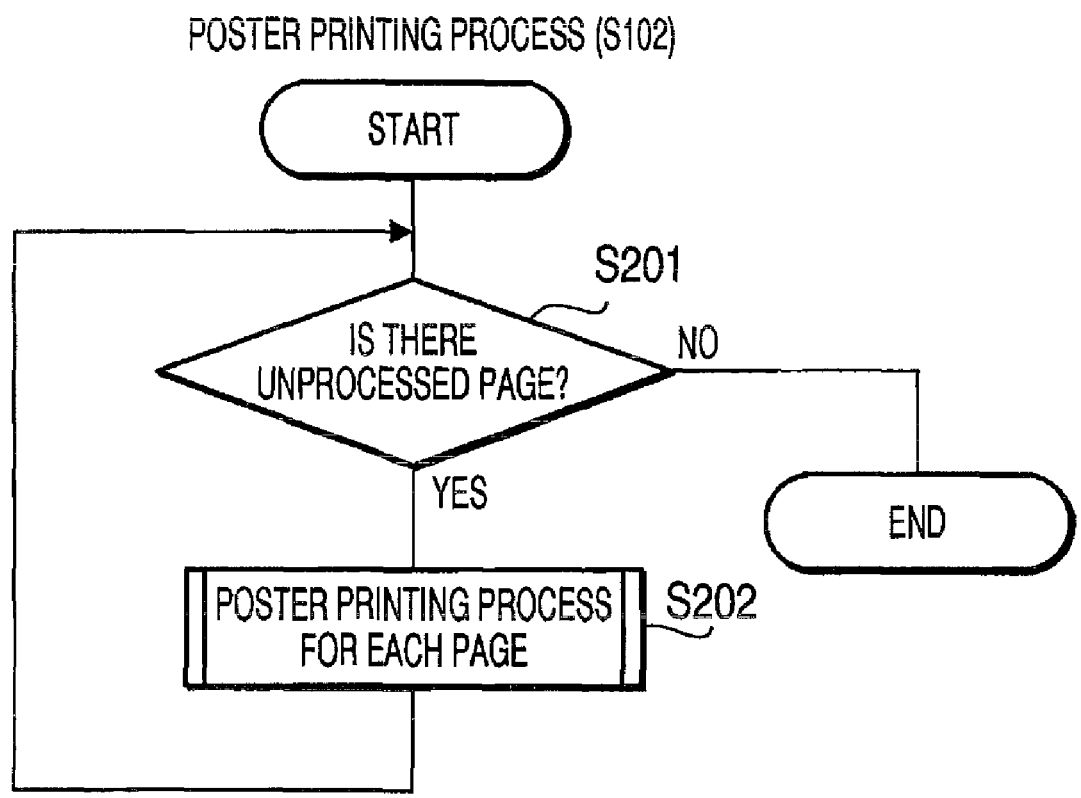
FIG. 4 is a flowchart showing a procedure of a main process of a poster printing process in the embodiment according to one or more aspects of the present invention.

As shown in FIG. 4, the CPU 10 of the PC 1 first determines whether there is an unprocessed page in the document to be printed (S201). When determining that there is an unprocessed page in the document to be printed (S201: Yes), the CPU 10 divides an image of a page to be processed into a specified number of divisional blocks, and performs a "poster printing process for each page" to transmit print data of each divisional block on a block-by-block basis (S202).

Here, the "poster printing process for each page" will be described in detail with reference to FIGS. 5 to 7.

Figure 5:
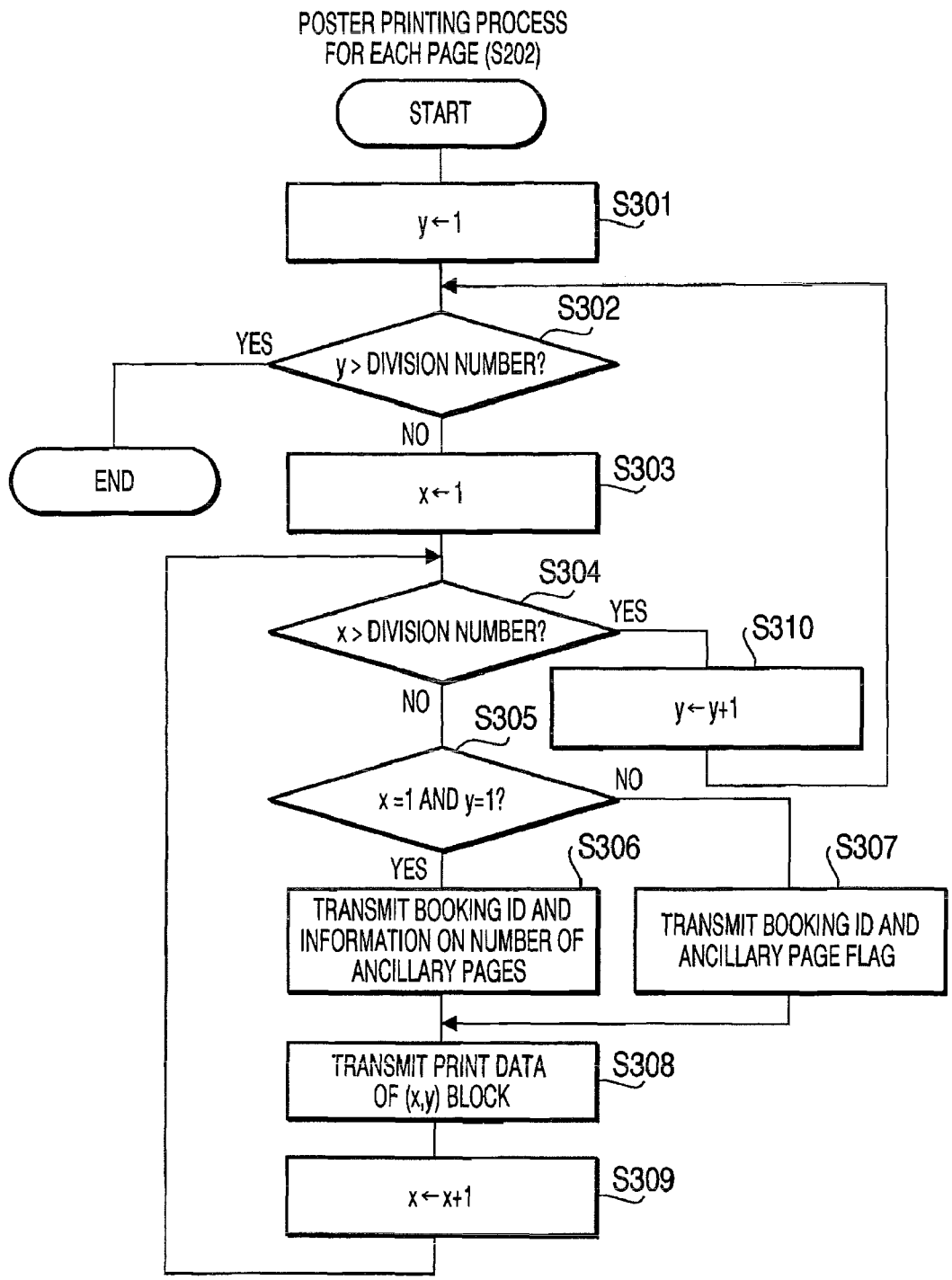
FIG. 5 is a flowchart showing a procedure of a poster printing process for each page in the embodiment according to one or more aspects of the present invention.

An explanation about the process in FIG. 5 will be provided under the following assumption: a page of image 601 to be processed is divided into four divisional blocks 602 to 605 with two even divisional blocks in the horizontal direction (i.e., an x-axis direction) and two even divisional blocks in the vertical direction (i.e., a y-axis direction), and each of the divisional blocks 602 to 605 is transmitted as a page of print data to the printer 100. It is noted that x-y coordinates (1, 1), (2, 1), (1, 2), and (2, 2) are assigned to the divisional blocks 602 to 605, respectively, which coordinates are defined based on division numbers (i.e., the numbers of the divisional blocks) in the x-axis direction and the y-axis direction.

Referring back to FIG. 5, the CPU 10 first sets a value of a counter y for the y-axis to one (S301). Next, the CPU 10 determines whether the value of the counter y is more than a division number for a processed page of image in the y-axis which division number is previously specified by the user (S302). In this case, the previously-specified division number in the y-axis is two, and the value of the counter y is one at the present time. Therefore, the CPU 10 determines in S302 that the value of the counter y is less than the previously-specified division number in the y-axis (S302: No), and goes to S303.

In S303, the CPU 10 sets a value of a counter x to one (S303). At this moment, the values of the counters x and y are (1, 1), respectively. Thereby, an image of the block 602 shown with the coordinates (1, 1) in FIG. 6 is determined as a first processed object. Subsequently, the CPU 10 determines whether the value of the counter x is more than a division value for the processed image in the x-axis which division number is previously specified by the user (S304). In this case, the previously-specified division number in the x-axis is two, and the value of the counter x is one at the present time. Therefore, the CPU 10 determines in S304 that the value of the counter x is less than the previously-specified division number in the x-axis (S304: No), and goes to S305.

In S305, the CPU 10 determines whether both the values of the counters x and y are one (S305). At the present time, the values of the counters x and y are (1, 1). Therefore, the CPU 10 determines that both the values of the counters x and y are one (S305: Yes), and goes to S306.

In S306, the CPU 10 transmits, to the printer 100, information on the number of ancillary pages and a booking ID (S306). The information on the number of ancillary pages is information representing the number of pages accompanying a page (a main page) that corresponds to the block 602 with the coordinates (1, 1) (hereinafter, simply referred to as the (1, 1) block 602) of which print data is to be first transmitted. In this case, as the poster printing with 2×2 divisional blocks is assumed, the page of the (1, 1) block 602 is accompanied by three ancillary pages of the (2, 1) block 603, the (1, 2) block 604, and the (2, 2) block 605. Namely, in S306, the value, 3 is transmitted as the information on the number of ancillary pages to the printer 100. Incidentally, in the case of poster printing with 3×3 divisional blocks, the number of ancillary pages is 8. Further, in the case of poster printing with 4×4 divisional blocks, the number of ancillary pages is 15. It is noted that the number to be transmitted as the information on the number of ancillary pages may be the total number of printed pages (in the case of the poster printing with 2×2 divisional blocks, four pages in total) that include the main page as well as the ancillary pages.

The booking ID is specific identification information that identifies association of the main page of the (1, 1) block 602 with the ancillary pages. For example, the booking ID is created with a combination of multiple pieces of information such as a date/time and a user who has issued a request for printing. Specifically, when a user name is "UserA" and a date/time for printing is 2008/12/15/17: 56: 20, a character string "UserA20081215175620," created by combining the user name and the date/time, may be employed as the booking ID.

After transmitting the information on the number of ancillary pages and the booking ID to the printer 100, the CPU 10 transmits, to the printer 100, print data of an (x, y) block corresponding to the current values of the counters x and y (S308). At the present time, both the values of the counters x and y are one. Therefore, the CPU 10 transmits the print data of the (1, 1) block 602 to the printer 100. Then, the CPU 10 increments the value of the counter x by one (S309), and goes back to S304. At this moment, as the values of the counters x and y are (2, 1), the image of the (2, 1) block 603 shown in FIG. 6 is determined as a next image to be processed.

Subsequently, the CPU 10 determines whether the value of the counter x is more than the division number in the x-axis direction (S304). In this case, since the division number in the x-axis direction and the current value of the counter x is two, the CPU 10 determines that the value of the counter x is equal to the division number in the x-axis direction (S304: No), and goes to S305. In 305, the CPU 10 determines whether both the values of the counters x and y are one (S305). As the current values of the counters x and y are (2, 1), the CPU 10 determines that the value of the counter x is not one though the value of the counter y is one (S305: No), and goes to S307.

In S307, the CPU 10 transmits an ancillary page flag and a booking ID to the printer 100 (S307). The ancillary page flag is information representing that print data to be transmitted immediately following the flag is of an ancillary page of the (1, 1) block 602. In addition, the booking ID transmitted here is the same as the booking ID created in S306 when the CPU 10 transmits the print data of the main page (i.e., the (1, 1) block 602) to be accompanied by the corresponding ancillary pages. The booking ID makes it possible to define association between the main page and the ancillary page transmitted following (the print data of) the main page.

After transmitting the ancillary page flag and the booking ID to the printer 100 in S307, the CPU 10 transmits, to the printer 100, print data of an (x, y) block corresponding to the current values of the counters x and y (S308). As the current values of the counters x and y are (2, 1), the CPU 10 transmits print data of the (2, 1) block 603. Then, the CPU 10 increments the value of the counter x by one (S309), and goes back to S304. At this moment, the values of the counters x and y are (3, 1).

Subsequently, in S304, the CPU 10 determines whether the value of the counter x is more than the division number in the x-axis direction (S304). In this case, the division number in the x-axis direction is two, and the current value of the counter x is three. Therefore, the CPU 10 determines that the value of the counter x is more than the division number in the x-axis direction (S304: Yes), and goes to S310. In S310, the CPU 10 increments the value of the counter y by one (S310), and goes back to S302. Then, the CPU 10 determines whether the value of the counter y is more than the division number in the y-axis direction (S302). In this case, the division number in the y-axis direction is two, and the current value of the counter y is two. Therefore, the CPU 10 determines that the value of the counter y is equal to the division number in the y-axis direction (S302: No). Thereafter, the CPU 10 goes to S303, in which the CPU 10 sets the value of the counter x to one. At this moment, as the values of the counters x and y are (1, 2), the image of the (1, 2) block 604 shown in FIG. 6 is determined as a next image to be processed.

Next, the CPU 10 determines whether the value of the counter x is more than the division number in the x-axis direction (S304). In this case, the division number in the x-axis direction is two, and the current value of the counter x is one. Therefore, the CPU 10 determines that the value of the counter x is less than the division number in the x-axis direction (S304: No). Then, the CPU 10 goes to S305, in which the CPU 10 determines whether both the values of the counters x and y are one (S305). As the present values of the counters x and y are (1, 2), the CPU 10 determines that the value of the counter y is one though the value of the counter x is two (S305: No), the CPU 10 goes to S307.

In S307, the CPU 10 transmits an ancillary page flag and a booking ID to the printer 100 (S307). The booking ID transmitted here is the same as the booking ID as the booking ID created in S306 when the CPU 10 transmits the print data of the main page (i.e., the (1, 1) block 602) accompanied by the corresponding ancillary page. The booking ID defines association of the main page with the ancillary page transmitted after transmission of the main page.

After transmitting the ancillary page flag and the booking ID to the printer 100 in S307, the CPU 10 transmits, to the printer 100, print data of an (x, y) block corresponding to the current values of the counters x and y (S308). As the current values of the counters x and y are (1, 2), the CPU 10 transmits print data of the (1, 2) block 604. Then, the CPU 10 increments the value of the counter x by one (S309), and goes back to S304. At this moment, the values of the counters x and y are (2, 2). Thereby, the image of the (2, 2) block 605 shown in FIG. 6 is determined as a next image to be processed.

Subsequently, in S304, the CPU 10 determines whether the value of the counter x is more than the division number in the x-axis direction (S304). In this case, the division number in the x-axis direction is two, and the current value of the counter x is two. Therefore, the CPU 10 determines that the value of the counter x is equal to the division number in the x-axis direction (S304: No), and goes to S305. In S305, the CPU 10 determines whether both the values of the counters x and y are one (S305). At the present time, the values of the counters x and y are (2, 2). Therefore, the CPU 10 determines that any of the values of the counters x and y is not one (S305: No), and goes to S307.

In S307, the CPU 10 transmits an ancillary page flag and a booking ID to the printer 100 (S307). It is noted that the booking ID transmitted here is the same as the booking ID created in S306 when the CPU 10 transmits the print data of the main page (i.e., the (1, 1) block 602) accompanied by the corresponding ancillary page. The booking ID defines association of the main page with the ancillary page transmitted after transmission of the main page.

After transmitting the ancillary page flag and the booking ID to the printer 100 in S307, the CPU 10 transmits, to the printer 100, print data of an (x, y) block corresponding to the current values of the counters x and y (S308). As the current values of the counters x and y are (2, 2), the CPU 10 transmits print data of the (2, 2) block 605. Then, the CPU 10 increments the value of the counter x by one (S309), and goes back to S304. At this moment, the values of the counters x and y are (3, 2).

Subsequently, in S304, the CPU 10 determines whether the value of the counter x is more than the division number in the x-axis direction (S304). In this case, the division number in the x-axis direction is two, and the current value of the counter x is three. Therefore, the CPU 10 determines that the value of the counter x is more than the division number in the x-axis direction (S304: Yes), and goes to S310. In S310, the CPU 10 increments the value of the counter y by one (S310), and goes back to S302. Then, the CPU 10 determines whether the value of the counter y is more than the division number in the y-axis direction (S302). In this case, the division number in the y-axis direction is two, and the current value of the counter y is three. Therefore, the CPU 10 determines that the value of the counter y is more than the division number in the y-axis direction (S302: Yes), and terminates the poster printing process for each page.

In FIG. 7, all pieces of print data transmitted by the PC 1 to the printer 100 in the aforementioned poster printing process for each page are listed in the transmitted order from the top. As shown in FIG. 7, when print data 702 of the main page, i.e., the (1, 1) block 602 is transmitted, data 701, which contains the booking ID and the information on the number of ancillary pages in connection with the main page, is transmitted in advance of the print data 702. Meanwhile, when print data 704, 706, and 708 of the (2, 1) block 603, the (1, 2) block 604, and the (2, 2) block 605, which blocks are the ancillary pages corresponding to the (1, 1) block 602, are transmitted, data 703, 705, and 707, each piece of which data contains the booking ID and the ancillary page flag in connection with a corresponding ancillary page, is transmitted in advance of the print data 704, 706, and 708.

Referring back to FIG. 4, the poster printing process will continuously be explained. After execution of the poster printing process for each page (see FIG. 5) in S302, the CPU 10 goes back to S201. After that, until determining in S201 that there is no unprocessed pages in the document to be printed, the CPU 10 repeatedly performs the steps S201 and S202 to transmit print data. Then, when determining that there is no unprocessed page in the document to be printed (S201: No), the CPU 10 terminates the poster printing process.

[Automatic Double-Side Printing Process by PC]

A detailed explanation will be provided about the automatic double-side printing process executed in S104 of the aforementioned print control process (see FIG. 3) with reference to FIGS. 8 and 9.

As shown in FIG. 8, the CPU 10 of the PC 1 first determines whether there is an unsent page in the document to be printed (S401). When determining that there is an unsent page in the document to be printed (S401: Yes), the CPU 10 determines whether a page to be transmitted this time has an odd page number (S402).

When determining that the page to be transmitted this time has an odd page number (S402: Yes), the CPU 10 transmits information on the number of ancillary pages and a booking ID to the printer 100. The information on the number of ancillary pages transmitted here is information representing the number of ancillary pages accompanying an odd page of which print data is to be transmitted in S405. It is noted that in the double-side printing, an even page to be printed on a backside of an odd page (i.e., a main page) corresponds to an ancillary page. Namely, the value, 1 is transmitted as the information on the number of ancillary pages to the printer 100 in S403. The booking ID is specific identification information for specifying association of an odd page, i.e., a main page with an even page to be printed on the backside of the odd page. For instance, the booking ID may be created with a combination of a date/time and a name of a user who has issued a request for printing.

After transmission of the information on the number of ancillary pages and the booking ID in S403, the CPU 10 transmits to the printer 100 print data of the odd page to be sent (S405), and goes back to S401.

Meanwhile, when determining that the page to be transmitted this time has an even page number (S402: No), the CPU 10 transmits an ancillary page flag and a booking ID to the printer 100 (S404). The ancillary page flag referred to here is information representing that print data to be transmitted in the next step S405 is of an ancillary page accompanying the odd page of which the print data has been sent in the last transmission. Additionally, the booking ID transmitted here is the same as the booking ID created in S403 when the CPU 10 transmits the print data of the odd page accompanied by the ancillary page. The booking ID defines association of the odd page with the ancillary page to be printed on the backside of the odd page.

After transmission of the ancillary page flag and the booking ID in S403, the CPU 10 transmits to the printer 100 the print data of the even page to be sent (S405), and goes back to S401. After that, the CPU 10 repeatedly performs the steps S401 to S405 to alternately transmit the print data of odd pages (main pages) and the print data of even pages (ancillary pages) in the document to be printed.

Meanwhile, when determining that there is no unsent page in the document to be printed (S401: Yes), the CPU 10 determines whether the total number of pages in the document to be printed is odd (S406). When determining that the total number of pages in the document to be printed is odd (S406: Yes), the CPU 10 transmits a booking ID and booking cancel information to the printer 100 (S407), and terminates the automatic double-side printing process.

The booking cancel information transmitted here is information that instructs to cancel a booking regarding an ancillary page which corresponds to an odd page sent in the last transmission. In other words, when the total number of pages is odd, there is no even page accompanying an odd page sent in the last transmission. Hence, by transmitting the booking cancel information for canceling a booking related to information on the number of ancillary pages that has already been transmitted in connection with the last odd page, it is possible to prevent an unnecessary booking from being assured at the side of the printer 100. It is noted that the booking ID transmitted along with the booking cancel information is a booking ID corresponding to the booking to be canceled, and the same as a booking ID created at the time of transmission of the last odd page.

Meanwhile, when determining that the total number of pages in the document to be printed is even (S406: No), the CPU 10 terminates the automatic double-side printing process.

In FIG. 9, all pieces of print data transmitted by the PC 1 to the printer 100 in the aforementioned automatic double-side printing process are listed in a transmitted order under an assumption that the total number of pages in the document to be printed is 5.

As illustrated in FIG. 9, when print data 902 of the first page is transmitted, data 901, which contains the booking ID and the information on the number of ancillary pages in connection with the first page, is transmitted in advance. Subsequently, when print data 904 of the second page is transmitted, data 903, which contains the same booking ID as that for the first page and the ancillary page flag for the second page, is transmitted in advance. Similarly, when print data 906 of the third page is transmitted, data 905, which contains the booking ID and the information on the number of ancillary pages in connection with the third page, is transmitted in advance. Further, when print data 908 of the fourth page is transmitted, data 907, which contains the same booking ID as that for the third page and the ancillary page flag for the fourth page, is transmitted in advance.

Finally, when print data 910 of the fifth page is transmitted, data 909, which contains the booking ID and the information on the number of ancillary pages in connection with the fifth page, is transmitted in advance. Nevertheless, there is no even page corresponding to the information on the number of ancillary pages. Accordingly, following the data 910, data 911 that contains the booking ID for the fifth page and the booking cancel information is transmitted.

It is noted that when the total number of pages in the document to be printed is even, the data 911 is not transmitted.

[Manual Double-Side Printing Process by PC]

Subsequently, a detailed explanation will be given about the manual double-side printing process executed in S106 of the aforementioned print control process (see FIG. 3) with reference to FIGS. 10 to 12.

As illustrated in FIG. 10, the CPU 10 of the PC 1 initially determines whether there is an unprocessed page in the document to be printed (S501). When determining that there is an unprocessed page in the document to be printed (S501: Yes), the CPU 10 determines whether a page to be processed this time has an odd page number (S502). When determining that the page to be processed this time has an odd page number (S502: Yes), the CPU 10 saves print data of the odd page into a temporary file provided on the RAM 14 of the PC 1 (S503), and goes back to S501.

When determining that the page to be processed this time has an even page number (S502: No) after determining that there is an unprocessed page in the document to be printed (S501: Yes), the CPU 10 first transmits information on the number of ancillary pages and a booking ID to the printer 100 (S504). The information on the number of ancillary pages transmitted here is information representing the number of ancillary pages accompanying the odd page of which print data is to be transmitted in the next step S505. It is noted that in the double-side printing, an even page to be printed on the backside of an odd page (a main page) corresponds to an ancillary page. Namely, the value, 1 is transmitted as the information on the number of ancillary pages to the printer 100 in S504. The booking ID is specific identification information for specifying association of an odd page as a main page with an even page to be printed on the backside of the odd page. For example, the booking ID may be created with a combination of a date/time and a user who has issued a request for printing.

After transmission of the information on the number of ancillary pages and the booking ID in S504, the CPU 10 transmits to the printer 100 the print data of the odd page stored in the temporary file (S505). Then, the CPU 10 deletes the data in the temporary file (S506). Subsequently, the CPU 10 saves data that contains a booking ID and an ancillary page flag for the odd page of which the print data has been transmitted in S505 into a file for even pages provided on the RAM 14 of the PC 1 (S507). Then, the CPU 10 saves, into the file for even pages, print data of the even page to be printed on the backside of the odd page of which the print data has been transmitted in S505, in association with the booking ID and the ancillary page flag saved in S507 (S508). Thereafter, the CPU 10 goes back to S501.

After that, by repeating the steps S501 to S508, the CPU 10 sequentially performs transmission of information on the number of ancillary pages and booking IDs and transmission of print data of odd pages. Concurrently, the CPU 10 accumulates, in the file for even pages, the print data of an even page that is an ancillary page of each odd page and data containing the booking ID and the ancillary page flag for each even page.

When determining that there is no unprocessed page in the document to be printed (S501: No), the CPU 10 determines in S509 whether there is print data of an odd page in the temporary file (S509). It is noted that at this time, print data of an add page is in the temporary file only when the total number of pages in the document to be printed is odd, and that what is stored in the temporary file is print data of the final page of the document. Meanwhile, when the total number of the pages in the document is even, the CPU 10 has already transmitted the print data in the temporary file before going to S509. Therefore, at the time of S509, there is no print data in the temporary file.

When determining that there is print data of an odd page in the temporary file (S509: Yes), the CPU 10 transmits to the printer 100 the print data of the odd page stored in the temporary file (S510). As the final odd page of the document does not have an ancillary page (an even page) to be printed on the backside thereof, the CPU 10 does not send information on the number of ancillary pages and a booking ID in this step. After transmission of the print data of the final and odd page, the CPU 10 deletes the print data in the temporary file (S511), and goes to S512. Meanwhile, when determining in S509 that there is no print data of an odd page in the temporary file (S509: No), the CPU 10 goes to S512.

In S512, the CPU 10 displays, on the display unit 18, a GUI 1101 as shown in FIG. 11 that prompts the user to reversely set the sheets with the odd pages printed on the first sides thereof. In response to the GUI 1101 being displayed, the user sets the sheets in the printer 100 such that the backsides (the second sides) of the sheets, which respectively have the first sides with the odd pages printed thereon, become sides to be subsequently printed. When the user clicks an "OK" button 1102 provided on the GUI 1101 after setting the sheets, the CPU 10 sequentially transmits, to the printer 100, data stored in the file for even pages, which data contains the booking IDs and the ancillary page flags, and print data of even pages (S513). After transmission of all pieces of the data in the file for even pages, the CPU 10 deletes the data in the file for even pages (S514). Thereafter, the CPU 10 terminates the manual double-side printing process.

In FIG. 12, all pieces of the print data, transmitted by the PC 1 to the printer 100 in the aforementioned manual double-side printing process, are listed in a transmitted order under an assumption that the total number of pages in the document to be printed is five.

As illustrated in FIG. 12, when print data 1202 of the first page is transmitted, data 1201, which contains the booking ID and the information on the number of ancillary pages in connection with the first page, is transmitted in advance. Subsequently, when print data 1204 of the third page is transmitted, data 1203, which contains the booking ID and the information on the number of ancillary pages in connection with the third page, is transmitted in advance. Next, when print data 1205 of the final fifth page is transmitted, the print data 1205 is only sent without transmission of data containing a booking ID and information on the number of ancillary pages.

After transmission of the print data of all of the odd pages, the print data of the even pages is transmitted. When print data 1207 of the second page to be printed on the backside of the first page is transmitted, data 1206, which contains the same booking ID as that for the first page and the ancillary page flag for the second page, is sent together. Subsequently, when print data 1209 of the fourth page to be printed on the backside of the third page is transmitted, data 1208, which contains the same booking ID as that for the third page and the ancillary page flag for the fourth page, is sent together.

[Printing Process by Printer]

Next, a detailed explanation will be given about a procedure of a printing process to be executed by the printer 100 in response to the print control process executed by the PC 1, with reference to FIG. 13. A printing process shown in FIG. 13 is adapted to be performed in response to a request for printing of the document being issued by the PC 1 to the printer 100.

Initially, the CPU 102 of the printer 100 determines whether there is unreceived data, i.e., data which has not received from the PC 1, in connection with the document to be printed (S601). When determining that there is unreceived data (S601: Yes), the CPU 102 receives various kinds of data transmitted by the PC 1, such as booking information and print data (S602). The booking information received in S602 is data received from the PC 1 which data contains the booking ID and the information on the number of ancillary pages or the ancillary page flag in connection with the print data of each page.

After receiving the data in S602, the CPU 102 determines whether the received data includes a booking ID (S603). When determining that the received data includes a booking ID (S603: Yes), the CPU 102 determines whether the received data further includes information on the number of ancillary pages (S604). The information on the number of ancillary pages is transmitted by the PC 1 in association with a main page in the poster printing, the automatic double-side printing, or the manual double-side printing (i.e., the first block in the poster printing or an odd page in the double-side printing).

When determining that the received data further includes information on the number of ancillary pages (S604: Yes), namely, when the received print data is for a main page, the CPU 102 makes the following determination: whether the sum of the number of pages specified by the information on the number of ancillary pages and the number of printed pages (the main page) corresponding to the information on the number of ancillary pages, i.e., a value of the number of ancillary pages plus one is equal to or less than the remaining number of printable pages stored on the non-volatile memory 108 of the printer 100 (S605).

When determining that the value of the number of ancillary pages plus one is equal to or less than the remaining number of printable pages (S605: Yes), the CPU 102 registers, onto the RAM 106 of the printer 100, booking information corresponding to the received booking ID to accept a booking for printing (S606). It is noted that what is registered as the booking information is data that contains the booking ID and the number of pages (hereinafter, referred to as the number of booking pages) specified by the information on the number of ancillary pages corresponding to the booking ID.

After registering the booking information in S606, the CPU 102 subtracts the value of the number of ancillary pages plus one, from the remaining number of printable pages stored on the non-volatile memory 108 (S607). Then, the CPU 102 prints the received print data of the main page on a sheet (S608), and goes back to S601.

Meanwhile, when determining in S605 that the value of the number of ancillary pages plus one is more than the remaining number of printable pages (S605: No), the CPU 102 terminates the printing process for the document. In this case, since it is impossible to print any of the received main page and one or more unreceived ancillary pages corresponding to the main page, the CPU 102 does not accept the booking for printing.

Meanwhile, when determining that the received data includes a booking ID (S603: Yes) and that the received data does not include information on the number of ancillary pages (S604: No), the CPU 102 determines whether the received data includes an ancillary page flag (S609). The ancillary page flag is transmitted by the PC 1 in association with an ancillary page in the poster printing, the automatic double-side printing, or the manual double-side printing (i.e., a second or later block in the poster printing, or an even page in the double-side printing).

When determining in S609 that the received data includes an ancillary page flag (S609: Yes), namely, when the received data is for an ancillary page, the CPU 102 determines, by reference to booking information corresponding to the received booking ID which information stored on the RAM 106, whether the number of booking pages in the booking information is equal to or more than one (S610). When determining that the number of booking pages in the booking information is equal to or more than one (S610: Yes), the CPU 102 decrements the number of booking pages in the booking information by one (S611).

Next, the CPU 102 determines whether the number of booking pages in the booking information is zero (S612). When determining that the number of booking pages in the booking information is zero (S612: Yes), the CPU 102 removes the booking information from the RAM 106 (S613), and goes to S608. Meanwhile, when determining that the number of booking pages in the booking information is not zero (S612: No), the CPU 102 goes to S608. In S608, the CPU 102 prints the received print data of the ancillary page on a sheet (S608). After printing the received print data of the ancillary page, the CPU 102 goes back to S601. Meanwhile, when determining that the number of booking pages in the booking information is zero, or there is no booking information corresponding to the received booking ID on the RAM 106 (S610: No), the CPU 102 terminates the printing process for the document.

Meanwhile, when determining in S603 that the received data includes a booking ID (S603: Yes), in the subsequent step S604 that the received data does not include information on the number of ancillary pages (S604: No), and further in S609 that the received data does not include an ancillary page flag (S609: No), the CPU 102 determines whether the received data includes booking cancel information (S614). When determining that the received data includes booking cancel information (S614: Yes), the CPU 102 add, to the remaining number of printable pages stored on the non-volatile memory 108, the number of booking pages based on booking information that conforms to a booking ID accompanying the booking cancel information (S615). Then, the CPU 102 removes, from the RAM 106, the booking information conforming to the booking ID of the booking cancel information (S616), and goes back to S601. It is noted that when determining in S614 that the received data does not include booking cancel information (S614: No), the CPU 102 goes back to S601.

Meanwhile, when determining in S603 that the received data does not include a booking ID (S603: No), the CPU 102 determines whether the remaining number of printable pages stored on the non-volatile memory 108 is equal to or more than one (S617). When determining that the remaining number of printable pages stored on the non-volatile memory 108 is zero (S617: No), the CPU 102 terminates the printing process for the document. Meanwhile, when determining that the remaining number of printable pages stored on the non-volatile memory 108 is equal to or more than one (S617: Yes), the CPU 102 subtracts one from the remaining number of printable pages (S618). Then, the CPU 102 prints the received print data on a sheet (S608), and goes back to S601.

By repeating the aforementioned steps S601 to S618 until determining in S601 that there is no unreceived data, the CPU 102 sequentially prints the pages of the document. Then, when determining in S601 that there is no unreceived data, the CPU 102 terminates the printing process for the document.

When the printing process shown in FIG. 13 is performed for the print data to be output in the poster printing as shown in FIG. 7, booking information as illustrated in FIG. 14A is registered based on the data 701 that contains the booking ID and the information on the number of ancillary pages. As illustrated in FIG. 14A, a booking ID received from the PC 1, "UserA20081215175620," and the number of booking pages based on the information on the number of ancillary pages, "3" are registered as booking information.

When the printing process shown in FIG. 13 is performed for the print data to be output in the automatic double-side printing as shown in FIG. 9, booking information as illustrated in FIG. 14B is registered individually based on the data 901 and the data 905 each of which contains the booking ID and the information on the number of ancillary pages. As illustrated in FIG. 14B, a booking ID received from the PC 1, "UserA20081215175621," and the number of booking pages based on the information on the number of ancillary pages, "1" are registered as booking information. It is noted that booking information registered based on the data 909 that contains the booking ID and the information on the number of ancillary pages is deleted on the basis of the data 911 that contains the booking cancel information.

When the printing process shown in FIG. 13 is performed for the print data to be output in the manual double-side printing as shown in FIG. 12, booking information as illustrated in FIG. 14C is registered based on the data 1201 and the data 1203 each of which contains the booking ID and the information on the number of ancillary pages. As illustrated in FIG. 14C, a booking ID received from the PC 1, "UserA20081215175622," and the number of booking pages based on the information on the number of ancillary pages, "1" are registered as booking information (on the upper side) corresponding to the data 1201. Further, a booking ID received from the PC 1, "UserA20081215175623," and the number of booking pages based on the information on the number of ancillary pages, "1" are registered as booking information (on the lower side) corresponding to the data 1203.

[Effects]

According to the printing system in the aforementioned embodiment, the following effects are provided.

When the PC 1 transmits, to the printer 100, print data of a main page such as the first block in the poster printing and an odd page in the double-side printing, it is possible to inform the printer 100 of the number of ancillary pages (e.g., a second or later block in the poster printing, and an even page in the double-side printing) required to be printed in association with the main page. Therefore, on the side of the printer 100, it is possible to determine whether requested printing is executable, based on the total number of pages to be printed, i.e., the main page and one or more ancillary pages accompanying the main page, without having to wait for print data of all pages to be received. Then, by booking printing of the main page and the ancillary pages when it is determined that the printing is executable based on the remaining number of printable pages, it is possible to assure the number of pages to be printed within the remaining number of printable pages. Thereby, at the time of execution of the poster printing or the double-side printing, it is possible to efficiently avoid an undesired situation that the printing is interrupted with the ancillary pages incompletely printed.

In response to acceptance of a booking for printing of a main page and one or more ancillary pages, the printer 100 subtracts the total number of a booking number of the ancillary pages and the main page from the remaining number of printable pages stored on the non-volatile memory 108. Thereby, it is possible to determine whether a later-received print job is executable, based on the accurate remaining number of printable pages after the subtraction.

By using a specific booking ID as identification information for associating a main page with an ancillary page, the printer 100 can associate print data of the main page with print data of the ancillary page and differentiate the print data of the ancillary page from other regular print data in an accurate manner.

Each time the PC 1 transmits print data of an individual ancillary page to the printer 100, the PC 1 transmits a booking ID that associates the ancillary page with a main page corresponding to the ancillary page, in association with the print data of the ancillary page. Thereby, when a single main page is accompanied by a plurality of ancillary pages, or when there are a plurality of sets of a main page and one or more ancillary pages in a single print job, the printer 100 can grasp association between the main page and the ancillary pages more clearly.

In the double-side printing, when the PC 1 transmits print data of an odd page (a main page) to the printer 100, the PC 1 can inform the printer 100 of the number of an even page (an ancillary page) to be printed on the backside of the odd page. Therefore, the printer 100 can determine whether requested printing is executable, based on the number of the both sides (the odd page and the even page), without having to wait for the print data of the both sides to be received. Then, when it is determined that the printing of the both sides is executable within the remaining number of printable pages, it is possible to assure the number of pages to be printed in the double-side printing within the remaining number of printable pages by booking the printing of the odd page and the even page. Hence, even when the number of printable pages is limited to a predetermined maximum number, it is possible to efficiently avoid an undesirable situation that the double-side printing is interrupted with only one of the both sides completely printed.

In the automatic double-side printing, when the total number of pages of a document is odd, the PC 1 transmits, to the printer 100, booking cancel information for canceling booking information for the final odd page. On the other hand, in response to receipt of the booking cancel information, the printer 100 deletes the booking information corresponding to the booking cancel information. When the total number of pages of the document is odd in the double-side printing, the final printed sheet has only one side printed. Therefore, the booking information for the final odd page is unnecessary. For this reason, the PC 1 transmits, to the printer 100, the booking cancel information to cancel the booking information. Thus, since the printer 100 deletes the corresponding booking information based on the booking cancel information, it is possible to prevent an unnecessary booking from being assured.

In the manual double-side printing, in the case where there is not an even page to be printed on a second side (a backside) of a sheet, the PC 1 does not transmit any booking ID or information on the number of ancillary pages when sending print data of an odd page to be printed on the first side of the sheet. Thereby, it is possible to prevent an unnecessary booking from being assured on the side of the printer 100.

In the poster printing, when transmitting to the printer 100 print data of a main page as a first one of a predetermined number of blocks into which a page of image is divided, the PC 1 can inform the printer 100 of the number of one or more remaining blocks (ancillary pages) to be printed in connection with the main page (the first block). Therefore, the printer 100 can determine, based on the total number of pages to be printed, whether the requested printing is executable, without having to wait for a set of all pieces of print data in the poster printing to be received. Then, when determining that all of the blocks can be printed within the remaining number of printable pages, the printer 100 can assure the number of pages to be printed in the poster printing within the remaining number of printable pages by booking printing of the main page and the ancillary pages. Thus, it is possible to efficiently avoid an undesirable situation that the poster printing is interrupted with only a part of a set of blocks completely printed, under a condition that the number of printable pages is limited up to a predetermined maximum number.

Hereinabove, the embodiment according to aspects of the present invention has been described. The present invention can be practiced by employing conventional materials, methodology and equipment. Accordingly, details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

What is claimed is:

1. A printing system comprising:
   an image forming device; and
   an information processing device configured to transmit print data containing a plurality of pages of images to the image forming device and control the image forming device to print the images on sheets based on the print data,
   wherein the information processing device comprises:
      a first transmitter configured to sequentially transmit, to the image forming device, print data of each of a main page and one or more ancillary pages to be printed in connection with the main page; and
      a second transmitter configured to transmit, to the image forming device, booking information regarding a number of the ancillary pages in association with transmission of the print data of the main page, and
   wherein the image forming device comprises:
      a receiver configured to receive data from the information processing device;
      a storage unit configured to store a remaining number of pages printable by the image forming device;
      a determining unit configured to, when the receiver receives the booking information along with the print data of the main page from the information processing device, determine whether a number of the main page and the ancillary pages that is determined based on the received booking information is equal to or less than the remaining number of printable pages stored on the storage unit;
      a registering unit configured to, when the determining unit determines that the number of the main page and the ancillary pages is equal to or less than the remaining number of printable pages, register a booking for printing of the main page and the ancillary pages; and
   a printing unit configured to print the main page and the ancillary pages based on the booking registered by the registering unit.

2. The printing system according to claim 1,
   wherein the image forming device further comprises an updating unit configured to, when the registering unit registers the booking for printing of the main page and the ancillary pages, update the remaining number of printable pages stored on the storage unit by subtracting the number of the main page and the ancillary pages from the remaining number of printable pages.

3. The printing system according to claim 1,
   wherein the booking information, transmitted by the second transmitter of the information processing device, contains identification information that identifies association between the main page and the ancillary pages.

4. The printing system according to claim 3,
   wherein the second transmitter is configured to, each time the first transmitter transmits the print data of each ancillary page, transmit identification information that identifies association between the main page and the ancillary page, to the image forming device in association with the print data of the ancillary page.

5. The printing system according to claim 1,
   wherein the information processing device is configured to control the image forming device to perform double-side printing to print a plurality of successive pages alternately on a first side and a second side opposite the first side of each sheet,
   wherein the information processing device further comprises a page identifying unit configured to, in the double-side printing, identify a page to be printed on the first side of each sheet as a main page and identify a page to be printed on the second side of each sheet as an ancillary page, and
   wherein the second transmitter is configured to transmit, to the image forming device, the booking information regarding the number of the ancillary page to be printed on the second side in association with transmission of the print data of the main page to be printed on the first side.

6. The printing system according to claim 5,
   wherein the information processing device further comprises a booking cancel unit configured to, when determining that a total number of pages to be printed in the double-side printing is odd, transmit, to the image forming device, booking cancel information to cancel the booking information transmitted in association with the transmission of the print data of a final one of the main pages.

7. The printing system according to claim 5,
   wherein the second transmitter is configured to, when determining that there is no ancillary page to be printed on the second side of a sheet in the double-side printing, prevent the booking information from being transmitted in association with the transmission of the print data of the main page to be printed on the first side of the sheet.

8. The printing system according to claim 1,
   wherein the information processing device is configured to control the image forming device to perform division printing to divide a single page of image into a plurality of pages of images and print the plurality of pages of images on respective sheets, and
   wherein the information processing device further comprises a page identifying unit configured to, in the division printing, identify a first page of the plurality of pages of which print data is to be first transmitted as the main page and identify one or more second pages other than the first page among the plurality of pages as the ancillary pages.

9. The printing system according to claim 1,
wherein the second transmitter is configured to transmit the booking information to the image forming device before the first transmitter transmits the print data of the ancillary pages.

10. An information processing device configured to transmit print data containing a plurality of pages of images to an image forming device and control the image forming device to print the images on sheets based on the print data, the information processing device comprising:
a first transmitter configured to sequentially transmit, to the image forming device, print data of each of a main page and one or more ancillary pages to be printed in connection with the main page; and
a second transmitter configured to transmit, to the image forming device, booking information regarding a number of the ancillary pages in association with transmission of the print data of the main page.

11. The information processing device according to claim 10,
wherein the booking information, transmitted by the second transmitter, contains identification information that identifies association between the main page and the ancillary pages.

12. The information processing device according to claim 11,
wherein the second transmitter is configured to, each time the first transmitter transmits the print data of each ancillary page, transmit identification information that identifies association between the main page and the ancillary page, to the image forming device in association with the print data of the ancillary page.

13. The information processing device according to claim 10, further configured to control the image forming device to perform double-side printing to print a plurality of successive pages alternately on a first side and a second side opposite the first side of each sheet,
wherein the information processing device further comprises a page identifying unit configured to, in the double-side printing, identify a page to be printed on the first side of each sheet as a main page and identify a page to be printed on the second side of each sheet as an ancillary page, and
wherein the second transmitter is configured to transmit, to the image forming device, the booking information regarding the number of the ancillary page to be printed on the second side in association with transmission of the print data of the main page to be printed on the first side.

14. The information processing device according to claim 13, further comprising a booking cancel unit configured to, when determining that a total number of pages to be printed in the double-side printing is odd, transmit, to the image forming device, booking cancel information to cancel the booking information transmitted in association with the transmission of the print data of a final one of the main pages.

15. The information processing device according to claim 13,
wherein the second transmitter is configured to, when determining that there is no ancillary page to be printed on the second side of a sheet in the double-side printing, prevent the booking information from being transmitted in association with the transmission of the print data of the main page to be printed on the first side of the sheet.

16. The information processing device according to claim 10, further configured to control the image forming device to perform division printing to divide a single page of image into a plurality of pages of images and print the plurality of pages of images on respective sheets,
wherein the information processing device further comprises a page identifying unit configured to, in the division printing, identify a first page of the plurality of pages of which print data is to be first transmitted as the main page and identify one or more second pages other than the first page among the plurality of pages as the ancillary pages.

17. The information processing device according to claim 10,
wherein the second transmitter is configured to transmit the booking information to the image forming device before the first transmitter transmits the print data of the ancillary pages.

18. A non-transitory computer readable medium having computer readable instructions stored thereon, the instructions, when executed by a computer configured to transmit print data containing a plurality of pages of images to an image forming device and control the image forming device to print the images on sheets based on the print data, causing the computer to perform:
a first transmitting step of sequentially transmitting, to the image forming device, print data of each of a main page and one or more ancillary pages to be printed in connection with the main page; and
a second transmitting step of transmitting, to the image forming device, booking information regarding a number of the ancillary pages in association with transmission of the print data of the main page.

* * * * *